United States Patent
Robotham et al.

(10) Patent No.: US 6,775,293 B1
(45) Date of Patent: Aug. 10, 2004

(54) METHOD AND APPARATUS FOR MONITORING BUFFER CONTENTS IN A DATA COMMUNICATION SYSTEM

(75) Inventors: Robert E. Robotham, Ottawa (CA); Denny Lee, Kanata (CA); Brent Gene Duckering, San Diego, CA (US); Jason Sterne, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 888 days.

(21) Appl. No.: 09/609,134

(22) Filed: Jun. 30, 2000

(51) Int. Cl.$^7$ .......................... H04L 12/28; H04L 12/56
(52) U.S. Cl. ...................... 370/412; 370/413; 370/230; 370/230.1; 370/232; 370/428; 370/429; 370/417
(58) Field of Search ................................. 370/412, 413, 370/230, 230.1, 231, 232, 229, 429, 428, 415, 417, 401; 710/52

(56) References Cited

U.S. PATENT DOCUMENTS

| | | | | |
|---|---|---|---|---|
| 5,231,633 A | * | 7/1993 | Hluchyj et al. | 370/429 |
| 6,115,748 A | * | 9/2000 | Hauser et al. | 709/234 |
| 6,219,728 B1 | * | 4/2001 | Yin | 710/52 |
| 6,233,243 B1 | * | 5/2001 | Ganmukhi et al. | 370/229 |
| 6,377,546 B1 | * | 4/2002 | Guerin et al. | 370/230 |
| 6,493,315 B1 | * | 12/2002 | Simpson et al. | 370/229 |
| 6,539,024 B1 | * | 3/2003 | Janoska et al. | 370/412 |
| 6,657,955 B1 | * | 12/2003 | Bonneau et al. | 370/229 |

* cited by examiner

*Primary Examiner*—Wellington Chin
*Assistant Examiner*—Chuong Ho

(57) ABSTRACT

A method and apparatus for buffering data units in a communication switch that allows for configurable monitoring of the buffer contents is presented. Such an apparatus includes a context table that stores a plurality of independent group identifiers for each connection. Although the group identifiers may include a partition group identifier and a loss group identifier that is dependent on the partition group identifier, additional group identifiers are included in the context table for each connection that are independent of other group identifiers in the context table. Such a context table may be dynamically reconfigured in order to group connections for buffer monitoring operations related to congestion detection, traffic shaping, and data admission with respect to buffering. When a data unit is received corresponding to a particular connection, the context table is referenced to retrieve the set of group identifiers corresponding to that connection. As a cell is stored in the buffer, count values corresponding to at least some of the group identifiers included in the set of group identifiers for that connection are incremented. Similarly, when data is dequeued from the buffer for forwarding, the set of group identifiers for that particular data unit is determined and the counters corresponding to at least some of those groups are decremented. As such, the count value corresponding to each of the groups can be referenced to determine the number of data units corresponding to that group that are currently stored within the buffer.

32 Claims, 3 Drawing Sheets

| Stream Identifier 210 | Group Identifier 221 | Group Identifier 222 | Group Identifier 223 | ... |
|---|---|---|---|---|
| Stream 231 | A | E | K | ... |
| Stream 232 | A | F | M | ... |
| Stream 233 | B | G | K | ... |
| Stream 234 | B | G | P | ... |
| Stream 235 | B | H | P | ... |
| Stream 236 | B | H | P | ... |

Context Table 30

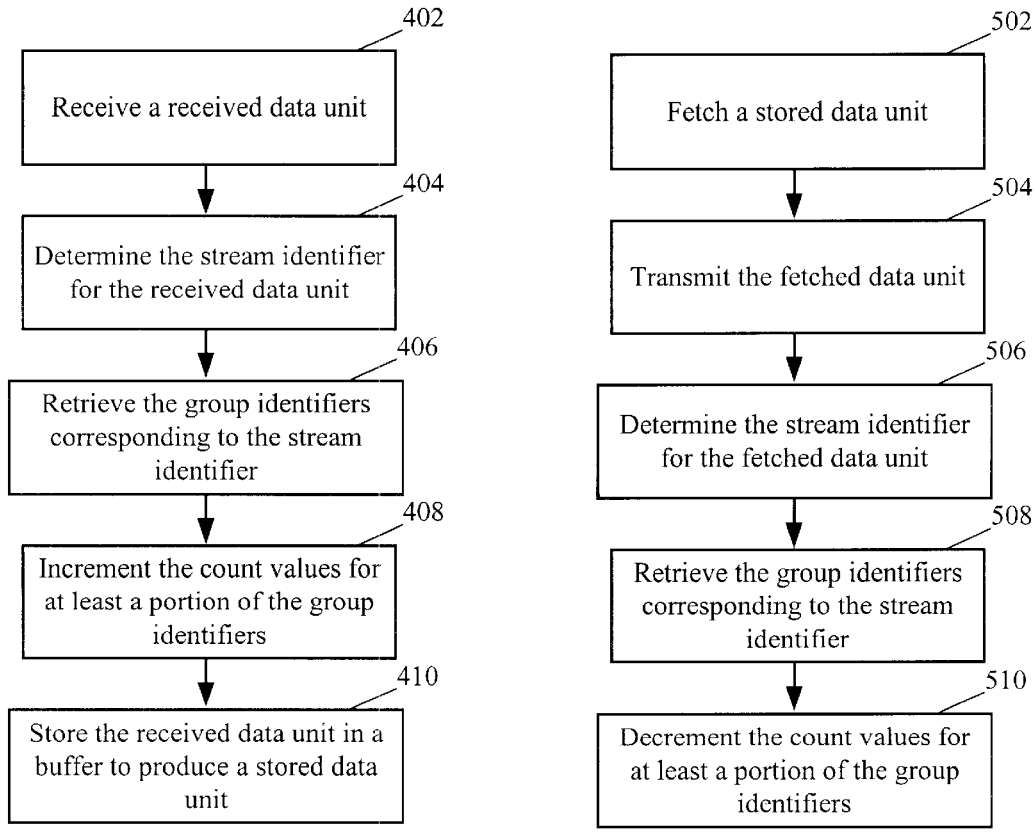

METHOD AND APPARATUS FOR MONITORING BUFFER CONTENTS IN A DATA COMMUNICATION SYSTEM

FIELD OF THE INVENTION

The invention relates generally to data buffering and more particularly to a method and apparatus for monitoring buffer contents in a data communications switch.

BACKGROUND OF THE INVENTION

Communication networks are known to include a plurality of communication switches that provide communication links between end users. Each switch within the network may receive data from a number of other switches in the network, and each switch may provide data that it receives to a plurality of subsequent destination switches. In order to control the data flow in the network, each of the switches may include one or more points at which data is buffered as it traverses through the switch. This allows the switches to regulate the data traffic within the switch and to other switches in the network such that bandwidth limitations across the various links are not exceeded. Data may also be buffered within switches to ensure that bandwidth available over various links in the network is fully utilized when "bursty" data is presented to the switch for transmission.

At each buffering point, data units, which may be portions of packets, cells, or other units of data, are examined to determine a particular connection to which they correspond, which may be indicated by a connection identifier. The connection identifier is then used to reference a context table that stores a partition group and a loss group for each connection. The partition group determines within which partition of the buffer data for that connection is stored. Loss groups, which are subsets of partition groups, are used to monitor such things as congestion at the buffering point. In one example, a partition group may be dedicated to constant bit rate (CBR) traffic, where numerous loss groups are included within that partition group where each loss group corresponds to a different set of CBR connections. Partition groups and loss groups are more thoroughly defined in a co-pending U.S. patent application Ser. No. 09/339,844 entitled "Flexible Threshold Based Buffering System For Use In Digital Communication Devices", which was filed on Jun. 25, 1999 and is assigned to the same assignee as the present application.

In such prior art systems, congestion levels for different loss groups are typically determined based on counters that monitor the input and output of data units corresponding to that particular loss group with respect to the buffering point. Thus, as cells corresponding to that loss group are received, the counter is incremented, and when cells corresponding to that loss group are dequeued from the buffer for forwarding, the counter is decremented. As such, the state of the counter at any one point will indicate the number of data units for that particular loss group currently stored within the buffer. Although these loss groups give some indication as to congestion, the congestion monitoring performed by these loss groups is directly tied to the buffering system, as loss groups are subsets of partition groups. Thus, each loss group can only contain connections that are included in the same partition group. As such, no monitoring of multiple connections that exist in different partition groups is possible. Similarly, no monitoring of the congestion for a single connection is possible, unless the entire loss group is dedicated to the connection.

Therefore, a need exists for a method and apparatus for buffering data within a switch that allows for more flexible monitoring of the buffered contents.

BRIEF DESCRIPTION OF THE DRAWINGS

FIG. 4 illustrates a flow diagram of a method for enqueuing data units in a buffer in accordance with a particular embodiment of the present invention;

FIG. 5 illustrates a flow diagram of a method for dequeuing data units from a buffer in accordance with a particular embodiment of the present invention; and FIG. 6 illustrates a flow diagram of a method for monitoring buffer contents in accordance with a particular embodiment of the present invention.

DETAILED DESCRIPTION OF A PREFERRED EMBODIMENT OF THE INVENTION

Generally, the present invention provides a method and apparatus for buffering data units in a communication switch that allows for configurable monitoring of the buffer contents. Such an apparatus includes a context table that stores a plurality of independent group identifiers for each connection. Although the group identifiers may include a partition group identifier and a loss group identifier that is dependent on the partition group identifier, additional group identifiers are included in the context table for each connection that are independent of other group identifiers in the context table. Such a context table may be dynamically reconfigured in order to group connections for buffer monitoring operations related to congestion detection, traffic shaping, and data admission with respect to buffering. When a data unit is received corresponding to a particular connection, the context table is referenced to retrieve the set of group identifiers corresponding to that connection. As a cell is stored in the buffer, count values corresponding to at least some of the group identifiers included in the set of group identifiers for that connection are incremented. Similarly, when data is dequeued from the buffer for forwarding, the set of group identifiers for that particular data unit is determined and the counters corresponding to at least some of those groups are decremented. As such, the count value corresponding to each of the groups can be referenced to determine the number of data units corresponding to that group that are currently stored within the buffer.

Figure 1:
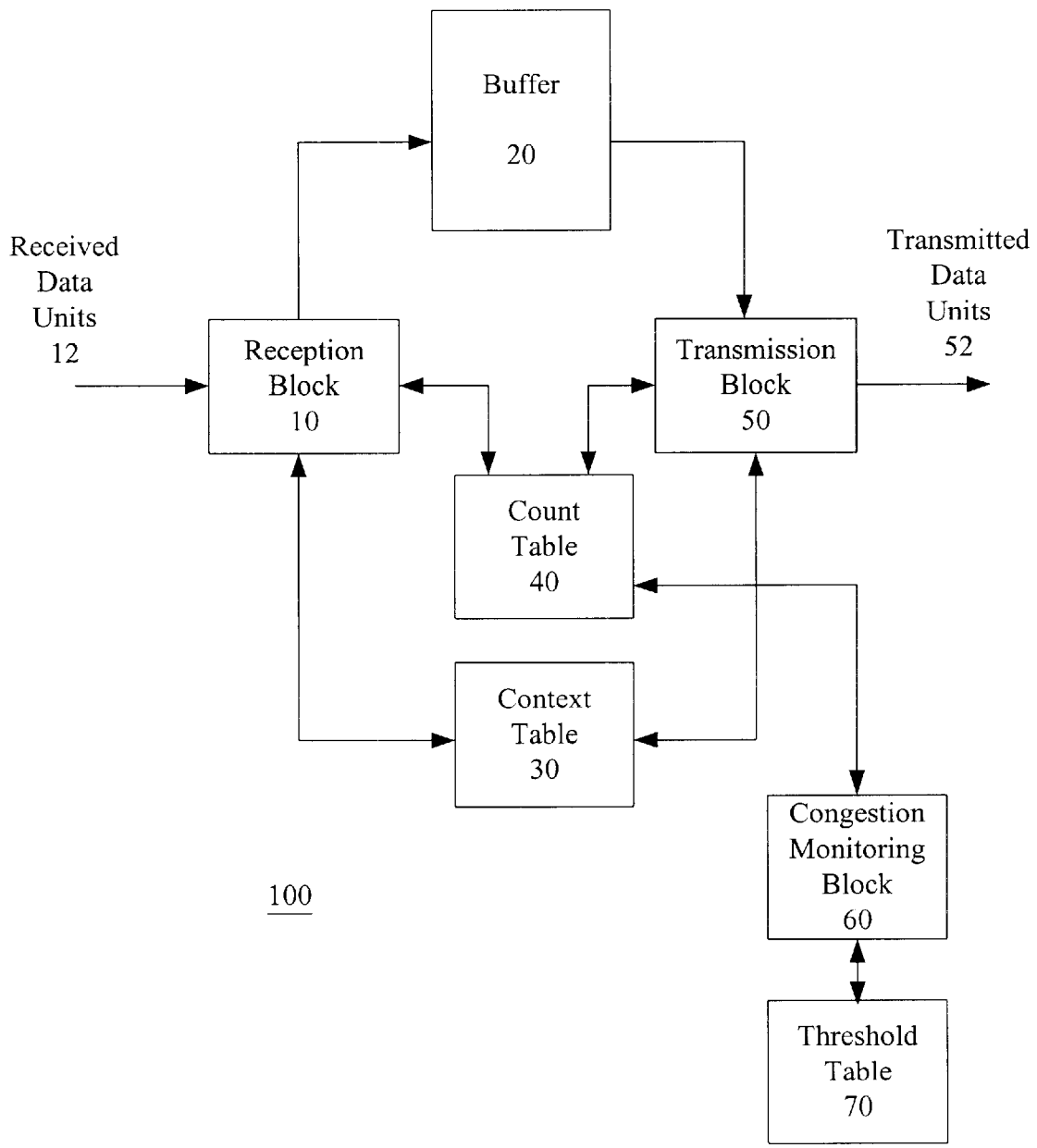
FIG. 1 illustrates a block diagram of a buffering circuit in accordance with a particular embodiment of the present invention.

The invention can be better understood with reference to FIGS. 1–6. FIG. 1 illustrates a block diagram of a buffering circuit 100 that includes a reception block 10, a buffer 20, a context table 30, a count table 40, and a transmission block 50. The buffering circuit 100 may be included at a buffering point within a switch within a data communications network, where each switch in the data communications network may have multiple buffering points. Such buffering points may be included the ingress line cards of the switch, in the egress line cards of the switch, or at other locations within the switch.

The context table 30 stores a set of independent group identifiers for each of a plurality of stream identifiers. Stream identifiers may be connection identifiers such as virtual connection identifiers (VCIs) or virtual path identifiers (VPIs) associated with data communication protocols such as asynchronous transfer mode (ATM), Internet protocol (IP), multi protocol label switching (MPLS), or frame relay.

The count table 40 stores a plurality of count values, where each count value corresponds to one of the independent group identifiers that may be listed in the context table for one or more of the stream identifiers. The count table 40 may be an array of individual counters, or may be a memory array that stores the count values.

The reception block 10, which is operably coupled to the context table 30, the count table 40, and the buffer 20, receives received data units 12. Each of the received data units 12 corresponds to a particular stream included in a plurality of streams. These streams may correspond to virtual connections, virtual paths, Internet Protocol (IP) packet streams, or similar streams corresponding to other data communication protocols. For each received data unit, the reception block determines the stream identifier that corresponds to the received data unit. Thus, in some embodiments the reception block 10 will determine to which virtual connection a particular data unit, which may be an ATM cell, corresponds.

Once the reception block 10 has determined the stream identifier for a received data unit, it utilizes this stream identifier to retrieve the set of independent group identifiers corresponding to that stream identifier from the context table 30. The context table 30 stores context on a per connection (per stream) basis. The reception block 10 then increments each of the count values stored in the count table 40 that correspond to one of the independent group identifiers included in the set retrieved from the context table 30. The reception block 10 stores the received data unit in the buffer 20, where the storage of the received data unit in the buffer 20 may be performed based on one or more of the independent group identifiers retrieved for the received data unit. For example, one of the independent group identifiers may be a partition group identifier that determines where in the buffer the received data unit is stored.

The transmission block 50, which is operably coupled to the buffer 20, the context table 30, and the count table 40, fetches stored data units from the buffer 20. For each of these fetched data units, the transmission block determines the stream identifier corresponding to the fetched data unit. As was the case with the reception block 10, the transmission block 50 utilizes the stream identifier to retrieve the set of independent group identifiers corresponding to that stream identifier from the context table 30. The transmission block 50 then decrements each of the count values in the count table 40 that correspond to one of the independent group identifiers retrieved from the context table 30. The transmission block 50 transmits the fetched data units as a transmitted data units 52.

Thus, as data units are received by the buffering circuit 100, the reception block determines the appropriate count values within the count table 40 that need to be incremented as the data unit is stored in the buffer 20. As data units are retrieved from the buffer and transmitted, the transmission block decrements the appropriate count values such that the count values in the count table 40 always reflect the current state of the buffer 20. The count values that are incremented and decremented in the count table 40 for a particular data unit are determined based on the set of group identifiers listed for the stream identifier to which that data unit corresponds. These group identifiers are listed in the context table 30.

Figures 2, 3:
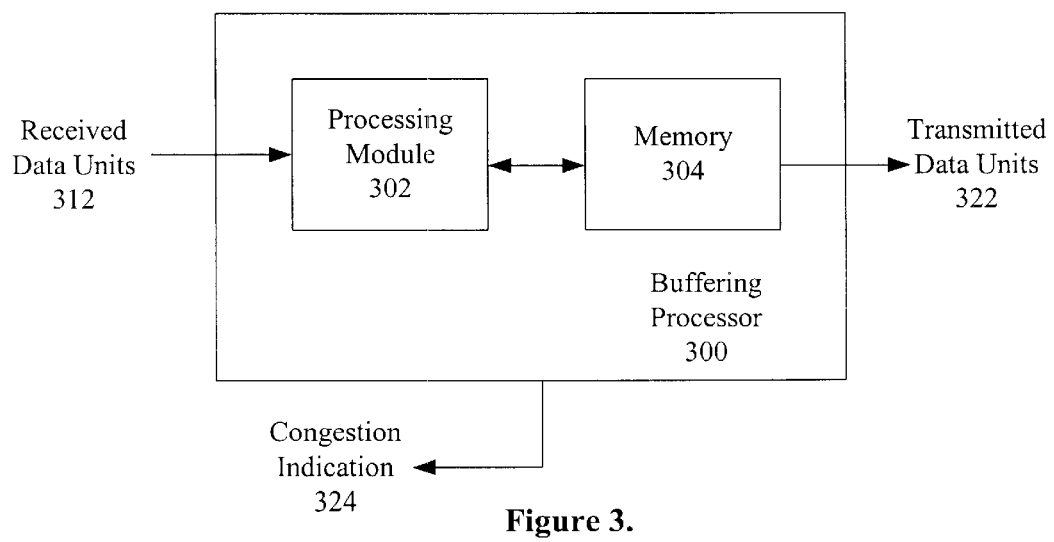
FIG. 2 illustrates a graphical representation of a context table in accordance with a particular embodiment of the present invention.
FIG. 3 illustrates a block diagram of a buffering processor in accordance with a particular embodiment of the present invention.

An example context table 30 is illustrated in FIG. 2. The context table is indexed based on the stream identifier 210 determined for a particular data unit. In one embodiment, the context table 30 may be structured as a content addressable memory (CAM) such that the stream identifiers do not need to be converted into a table lookup pointer or an address in order to reference the context table 30. For each stream identifier stored within the context table 30, a plurality of group identifiers 221–223 are listed. Note that the number of group identifiers 221–223 may be configured based on the needs of a particular system.

In one embodiment, the group identifiers listed for each stream identifier include a partition group identifier, a loss group identifier, and a congestion group identifier. In such an embodiment, different input data streams, or connections, can be assigned to different congestion groups independent of their partition group assignments. This was not possible in prior art systems in which the loss groups were often used to monitor congestion. Such prior art systems were restricted to including connections in the same partition groups in loss groups such that congestion monitoring could not utilize a single count value to track multiple connections included in different buffer partition groups.

Thus, in one example, the group identifier 221 may correspond to a partition group identifier, the group identifier 222 may correspond to a loss group identifier, and the group identifier 223 may correspond to a congestion group identifier. In some systems, partition group assignments may be based on the input or output port corresponding to each connection. In other cases, partition group assignments may be based on differing class or quality of service for the various connections supported in the network. In such an example, streams 231 and 232 may correspond to ATM virtual connections that support CBR traffic. The streams 233–236 may be ATM virtual connections that support available bit rate (ABR) traffic. As such, the data corresponding to these different types of traffic may be stored in the buffer in separate partitions. In such an example, the group identifier 221, which corresponds to the partition group identifier, indicates that streams 231 and 233 store their data in partition group A, whereas streams 233–236 store their data in partition group B.

Within these partitioned groups, various loss groups may be established in a manner that is compatible with the prior art systems. Thus, the virtual connection corresponding to stream 231 may be included in loss group E, which is indicated by the group identifier 222, whereas the virtual connection corresponding to the stream 232 may be in loss group F. The virtual connections corresponding to streams 233 and 234 are shown to be included in loss group G, and the virtual connections corresponding to streams 235 and 236 are shown to be included in loss group H. In order to further emphasize the limitations of the prior art, assume that it is desirable to monitor the amount of data currently stored in the buffer for streams 231 and 233. Streams 231 and is 233 may correspond to a particular customer who wishes to monitor his or her own congestion levels. Because these two streams are assigned to different partition groups, it is not possible to assign these streams to a common loss group. Thus, the monitoring is conditioned on the way in which the data for the various streams is buffered in the system. As such, prior art solutions that only included partition and loss groups could not monitor the total amount of data included in the buffer for these two streams using a single count value.

The present invention provides a means for separating the monitoring of the buffer status from the way in which the buffer is partitioned. As is illustrated, the group identifier 223, which may correspond to a congestion group, can be assigned independent of the partition group assignment for each stream. Thus, stream 231 is assigned to congestion group K, as is stream 233. Thus, if the amount of data in the buffer for these two streams 231 and 233 is required, the count value corresponding to group identifier K can be referenced. It should be noted that counters may only be maintained in the count table 40 for the loss groups and the congestion groups. Thus, count values for partition groups may not be maintained in some embodiments.

As is illustrated in FIG. 2, streams 234-236 are all assigned to congestion group P. The count value for congestion group P can be monitored in order to determine if the amount of data currently buffered for congestion group P is above a particular threshold. This may be accomplished by a congestion monitoring block 60 illustrated in FIG. 1. The congestion monitoring block 60 may reference a threshold table 70 that stores various threshold levels for different congestion groups. These threshold levels may be graded such that low, medium, or high levels of congestion may be detected using multiple thresholds. If too much data is stored in the buffer for a particular congestion group, a congestion indication 62 may be generated.

In the case of ABR systems, which utilize feedback in order to regulate data transmission rates of upstream nodes, the congestion indication 62 may be used to reduce the transmission data rate at an upstream node such that the buffer 20 does not overflow.

Although the example described thus far involves utilizing additional group identifiers in the context table 30 to monitor congestion, the additional groups may be other forms of population groups that are used to monitor the population of data units for various groupings of connections. Such population groups may be useful for performing a number of functions other than detecting congestion at the buffering point.

One use for such population groups is determining data admission decisions with respect to the buffering process. In such an application, the reception block 10 may, after fetching the group identifiers corresponding to a particular data unit, determine that a count value corresponding to one of those group identifiers indicates that data units belonging to that group should be discarded rather than stored in the buffer 20. This may be because the buffer is nearly full and the group identifier indicates that this is low priority data that should be discarded in order to leave the buffer space for higher priority data. When the reception block 10 discard data units, the count values associated with those data units would not typically be updated. Note that the reception block 10 may perform a probability discard analysis rather than simply discarding the data unit. A probability discard analysis would involve a graded scale that determines the likelihood that the data unit is discarded. A first threshold level with respect to the count value for the group may indicate a point at which a small probability of discard exists, whereas a higher threshold indicates a level at which all data units included in that group are discarded. The count values between these two thresholds may form a graded scale where the probability of discard increases as the count value nears the higher threshold.

Another application in which the population groups could be utilized is in the control of transmission rates for various population groups. This may be referred to as shaping the data flow on the outputs of the buffering circuit. In such an application, the transmission block 50 may reference various count values in the count table 40 to determine which of the data units stored in the buffer 20 should be fetched for transmission. A higher count value in the count table 40 may indicate that data units included in a particular partition of other defined portion of the buffer 20 should be preferentially fetched for transmission.

The transmission block 50 may support a number of output streams, where different groups are structured to correspond to each of the output streams. As such, the count values for each of these groups can be evaluated to determine which data should be fetched for transmission across each of the output streams. This may be used in conjunction with a scheduler that controls transmission where a low count value may cause a group to be excluded from consideration by the scheduler when it is determining which cells should be transmitted. In another example, two output streams may share limited output bandwidth, and if the buffer count corresponding to one of the streams decreases below a specific threshold the other stream may be allowed to increase its transmission rate by adjusting its shaping number.

In some embodiments, a particular stream, or connection, may correspond to a large number of population groups. Similarly, different streams may correspond to a different numbers of population groups. Thus, one set of population groups may correspond to congestion detection, another may correspond to shaping, and another may correspond to data admission for buffering.

FIG. 3 illustrates a block diagram of a buffering processor 300 that may perform similar functions to the buffering circuit 100 of FIG. 2. Thus, the buffering processor 300 receives received data units 312 and transmits transmitted data units 322. The buffering processor 300 buffers the received data units 312 prior to transmitting them, and maintains a set of count values corresponding to a number of group identifiers that may include partition group identifiers, loss group identifiers, congestion group identifiers, or other population group identifiers. If the buffering processor 300 performs congestion monitoring, it may generate one or more congestion indications 324 that could be used to provide notice of the congestion or to limit the transmission bandwidth of an upstream entity.

The buffering processor 300 of FIG. 3 includes a processing module 302 and memory 304. The processing module 302 may be a single processing device or a plurality of processing devices. Such a processing device may be a microprocessor, microcontroller, digital signal processor, microcomputer, state machine, logic circuitry, or any device that processes information based on operational or programming instructions. The memory 304 may be a single memory device or a plurality of memory devices. Such a memory device may be a read only memory device, random access memory device, floppy disk, hard drive memory, or any device that stores digital information. Note that when the processing module 302 has one or more of its functions performed by a state machine or logic circuitry, the memory containing the corresponding operational instructions is embedded within the state machine or logic circuitry. In the case where the memory 304 must store data for buffering operations, at least a portion of the memory 304 is read/write capable.

The memory 304 stores programming or operational instructions that, when executed by the processing module 302, cause the processing module 302 to perform at least a portion of the steps of the methods illustrated in FIGS. 4–6. Note that the buffering processor 300 may implement some of the functions of the methods of FIGS. 4–6 through the use of software stored in the memory 304, whereas other portions of the methods of FIGS. 4–6 may be implemented using hardware or circuitry included within the buffering processor 300. Thus, in some embodiments, a mix of hardware and software may be used to perform the methods illustrated in FIGS. 4–6.

FIG. 4 illustrates a flow diagram of a method for enqueuing data into a buffer. The method begins at step 402 where a data unit is received. Each data unit that is received corresponds to a particular stream of a plurality of streams, where each stream is identified by a stream identifier. In some embodiments, the streams may be virtual connections identified by virtual connection identifiers, whereas in other embodiments, the streams may be virtual paths identified by virtual path identifiers. Different embodiments may present different means for providing the stream identifier corresponding to each stream. The data units received may correspond to cells or portions of cells carried by a cell-based network such as ATM, or the data units may correspond to packets or portions of packets being carried by a packet-based network such as an IP network, a frame relay network, or a X.25 network. Thus, the plurality of streams may include data communication streams of varying formats including, but not limited to IP, MPLS, ATM, and frame relay.

At step 404, a stream identifier corresponding to the data unit received at step 402 is determined. At step 406, the stream identifier is used to retrieve a plurality of independent group identifiers to which the received data unit corresponds. At step 408, count values corresponding to at least a portion of the plurality of independent group identifiers to which the data unit corresponds are incremented. Thus, if the independent group identifiers correspond to a partition group identifier, a loss group identifier, and a congestion group identifier, count values corresponding to the loss group identifier and the congestion group identifier may be incremented at step 408. In other embodiments, additional actions may be taken based on the plurality of independent group identifiers determined at step 406.

At step 410, the data unit is stored in the buffer to produce a stored data unit. Storage of the data unit in the buffer may be dependent on one or more of the group identifiers retrieved at step 406. For example, if one of the group identifiers is a partition group identifier, the partition group identifier may indicate the particular partition in the buffer in which the data unit is to be stored.

FIG. 5 illustrates a flow diagram of a method for dequeuing stored data units from the buffer. Note that the method of FIG. 5 is illustrated separate from the method of FIG. 4 as the two may operate independently. The only dependency between the methods is that data must be stored in the buffer through the execution of the method of FIG. 4 before it can be dequeued by the method shown in FIG. 5.

The method of FIG. 5 begins at step 502 where a stored data unit is fetched from the buffer. The data unit that is fetched from the buffer may be determined based on count values currently stored corresponding to different group identifiers, as was described earlier. At step 504, the stored data unit that was fetched is transmitted. Note that step 504 may occur at any time with respect to steps 506–510 such that in some embodiments, steps 506–510 may all be completed prior to actual transmission of the data unit.

At step 506, the stream identifier for the data unit is determined. At step 508, the stream identifier is used to fetch the group identifiers to which that stream identifier corresponds. Preferably, these group identifiers are stored in a per connection context table. At step 510, the count values corresponding to at least a portion of these group identifiers are decremented. Note that in some embodiments it may be useful to only increment count values as data is received, such that a total count as to the amount of data traffic corresponding to a particular group can be maintained. Such a count value could be reset periodically after the count value was utilized.

FIG. 6 illustrates a flow diagram of a method for monitoring and utilizing the count values generated through the methods of FIGS. 4 and 5. The method of FIG. 6 begins at step 602 where a count value corresponding to a particular group identifier is retrieved. The various count values may be stored together in a single count table, or the count values may each be individually be stored in a discrete counter.

At step 604, the count value is compared with at least one threshold for that count value to produce comparison results. In some instances, multiple thresholds may be included for a count value where the thresholds define certain ranges in which different actions are taken. The comparison results generated at step 604 may be used for a variety of applications, many of which were described earlier. The comparison step may include performing some operations on the count value. For example, the count value could be low-pass filtered. Steps 606–610 illustrated some possible functions that may utilize the comparison results generated at step 604.

At step 606, congestion is determined based on the comparison result. Thus, the threshold at step 604 may include a congestion threshold such that when the count value for a particular group exceeds the threshold value, it is recognized that data has been built up in the buffer for that group to a point where the latency associated with passing through this buffering point may be significant. This may be indicative of a faulty portion of the network, or simply an excessive amount of traffic. Multiple thresholds may be used at steps 604 to determine at different levels of congestion.

Based on the congestion detected at step 606, various actions could be performed. In one embodiment, a feedback mechanism such as that that exists in the ATM ABR service category could be used to reduce the transmission rate of an upstream entity. This may be accomplished by simply indicating that congestion exists. In such cases the upstream entity may reduce its transmission rate based on the congestion notification. In other cases, an explicit rate may be determined based on the level of congestion and communicated to the upstream entity where the upstream entity adjusts its transmission rate to correspond to the explicit rate.

At step 608, shaping rates may be reconfigured based on the comparison results. Thus, the rate at which data is transmitted from different groups may be varied in accordance with the amount of data stored in the buffer for those groups.

At step 610, data admission decisions are determined based on the comparison results. This was described earlier and may be used to determine whether or not certain data units received are stored in the buffer or discarded. Thus, if a particular group exceeds a threshold level in terms of its storage in the buffer, subsequently received data units for that group may be discarded to insure that that group does not consume more buffering resources than it has been allotted.

The present invention provides for congestion groups that monitor congestion in a buffer, where the congestion groups are generated independently of any groups that determine how the data is stored in the buffer. An additional entry in the context table allows for different connections, or streams, to be mapped into different congestion groups independent of the partition groups used for buffering. By maintaining a count value for each congestion group; the current amount of data for that group stored in the buffer can easily be ascertained. Similar additional count values and group identities can be utilized to perform population counts that are useful for other applications with respect to the buffering system. As such, much more flexible monitoring of the current status of the buffer is achieved without significant additional circuitry.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for monitoring current buffer contents, comprising:
    receiving received data units corresponding to a plurality of streams, wherein each stream of the plurality of streams is identified by a stream identifier;
    for each received data unit as the received data unit is received:
        determining a stream identifier for the received data unit;
        utilizing the stream identifier for the received data unit to retrieve a plurality of independent group identifiers to which the received data unit corresponds; and
        incrementing count values corresponding to at least a portion of the plurality of independent group identifiers to which the received data unit corresponds;
    storing the received data units in a buffer to produce stored data units;
    fetching the stored data units from the buffer to produce fetched data units;
    transmitting the fetched data units as transmitted data units; and
    for each transmitted data unit as the transmitted data unit is transmitted:
        determining a stream identifier for the transmitted data unit;
        utilizing the stream identifier for the transmitted data unit to retrieve a plurality of independent group identifiers to which the transmitted data unit corresponds; and
        decrementing count values corresponding to at least a portion of the plurality of independent group identifiers to which the transmitted data unit corresponds.

2. The method of claim 1 further comprises utilizing at least one count value for monitoring congestion.

3. The method of claim 2, wherein monitoring congestion further comprises comparing the at least one count value with at least one threshold level.

4. The method of claim 1 further comprises utilizing at least one count value for determining data admission decisions with respect to buffering.

5. The method of claim 1 further comprises utilizing at least one count value for determining feedback for regulating transmission rates at an upstream entity that sends at least a portion of the received data units.

6. The method of claim 1 further comprises utilizing at least one count value for determining transmission rate of stored data units.

7. The method of claim 1, wherein the plurality of independent group identifiers for each received and transmitted data unit includes group identifiers corresponding to a partition group, a loss group and a congestion group.

8. The method of claim 1, wherein the plurality of independent group identifiers for each received and transmitted data unit includes group identifiers corresponding to a partition group, a loss group and a population group.

9. The method of claim 8, wherein the plurality of independent group identifiers for each received and transmitted data unit includes group identifiers corresponding to a partition group, a loss group and a plurality of population groups.

10. The method of claim 1, wherein the received data units are at least portions of cells being carried by a cell based network.

11. The method of claim 1, wherein the received data units are at least portions of packets being carried by a packet based network.

12. The method of claim 1, wherein the plurality of streams includes data communication streams of a format included in a set of formats, wherein the set of formats includes: internet protocol (IP) format, Multi-Protocol Label Switching (MPLS) format, Asynchronous Transfer Mode (ATM) format, and Frame Relay format.

13. The method of claim 1, wherein independent group identifiers are stored in a context table.

14. A buffering circuit, comprising:
    a context table that stores a set of independent group identifiers for each of a plurality of stream identifiers;
    a count table that stores a plurality of count values, wherein each count value corresponds to an independent group identifier;
    a buffer;
    a reception block operably coupled the context table, the count table, and the buffer, wherein the reception block receives received data units corresponding to a plurality of streams, wherein for each received data unit, the reception block:
        determines a stream identifier corresponding to the received data unit;
        utilizes the stream identifier corresponding to the received data unit to retrieve a set of independent group identifiers corresponding to the stream identifier from the context table;
        increments a count values stored in the count table corresponding to the set of independent group identifiers corresponding to the stream identifier; and
        stores the received data unit in the buffer to produce a stored data unit; and
    a transmission block operably coupled to the context table, the count table, and the buffer, wherein the transmission block fetches stored data units from the buffer to produce fetched data units, wherein for each fetched data unit, the transmission block:
  determines a stream identifier corresponding to the fetched data unit;
  utilizes the stream identifier corresponding to the fetched data unit to retrieve a set of independent group identifiers corresponding to the stream identifier from the context table;
  decrements count values corresponding to the set of independent group identifiers corresponding to the stream identifier; and
  transmits the fetched data unit.

15. The buffering circuit of claim 14 further comprises a congestion monitoring block operably coupled to the count table, wherein the congestion monitoring block monitors congestion in the buffering circuit by monitoring values of at least a portion of the plurality of count values stored in the count table.

16. The buffering circuit of claim 15, wherein the congestion monitoring block monitors values such that it includes comparing count values with threshold values.

17. The buffering circuit of claim 15, wherein the congestion monitoring block generates feedback that is provided to a source of at least a portion of the received data units, wherein the source regulates it transmission rate of data units based on the feedback.

18. The buffering circuit of claim 14, wherein the reception block selectively discards received data units based on at least a portion of the plurality of count values stored in the count table.

19. The buffering circuit of claim 14, wherein the transmission block selectively fetches stored data units from the buffer based on at least a portion of the count values stored in the count table.

20. The buffering circuit of claim 14, wherein the buffer includes a plurality of partitions, and each set of independent group identifiers includes a partition group identifier which is used by the reception block for storing a corresponding data unit in a partition of the plurality of partitions in the buffer.

21. The buffering circuit of claim 20, wherein each set of independent group identifiers includes a congestion group identifier that is configurable independent of the partition group identifier for the set.

22. The buffering circuit of claim 14, wherein the received data units include at least one of asynchronous transfer mode (ATM) cells, internet protocol (IP) packets, and frame relay packets.

23. The buffering circuit of claim 14, wherein each of the independent group identifiers includes a partition group identifier, a loss group identifier, and at least one population group identifier.

24. A buffering processor, comprising:
  a processing module; and
  memory operably coupled to the processing module, wherein the memory stores operating instructions that, when executed by the processing module, cause the processing module to perform functions that include:
    receiving received data units corresponding to a plurality of streams, wherein each stream of the plurality of streams is identified by a stream identifier;
    for each received data unit as the received data unit is received:
      determining a stream identifier for the received data unit;
      utilizing the stream identifier for the received data unit to retrieve a plurality of independent group identifiers to which the received data unit corresponds; and
      incrementing count values corresponding to at least a portion of the plurality of independent group identifiers to which the received data unit corresponds;
    buffering the received data units to produce stored data units;
    fetching the stored data units to produce fetched data units;
    transmitting the fetched data units as transmitted data units; and
    for each transmitted data unit as the transmitted data unit is transmitted:
      determining a stream identifier for the transmitted data unit;
      utilizing the stream identifier for the transmitted data unit to retrieve a plurality of independent group identifiers to which the transmitted data unit corresponds; and
      decrementing count values corresponding to at least a portion of the plurality of independent group identifiers to which the transmitted data unit corresponds.

25. The buffering processor of claim 24, wherein the functions performed by the processing module further comprise utilizing at least one count value for monitoring congestion.

26. The buffering processor of claim 24, wherein the functions performed by the processing module further comprise utilizing at least one count value for determining data admission decisions with respect to buffering.

27. The buffering processor of claim 24, wherein the functions performed by the processing module further comprise utilizing at least one count value for determining feedback for regulating transmission rates at an upstream entity that sends at least a portion of the received data units.

28. The buffering processor of claim 24, wherein the functions performed by the processing module further comprise utilizing at least one count value for determining transmission rate of stored data units.

29. The buffering processor of claim 24, wherein the plurality of independent group identifiers for each received and transmitted data unit includes group identifiers corresponding to a partition group, a loss group and a congestion group.

30. The buffering processor of claim 24, wherein the plurality of independent group identifiers for each received and transmitted data unit includes group identifiers corresponding to a partition group, a loss group and a population group.

31. The buffering processor of claim 30, wherein the plurality of independent group identifiers for each received and transmitted data unit includes group identifiers corresponding to a partition group, a loss group and a plurality of population groups.

32. The buffering processor of claim 24, wherein the plurality of streams includes data communication streams of a format included in a set of formats, wherein the set of formats includes: internet protocol (IP) format, Multi-Protocol Label Switching (MPLS) format, Asynchronous Transfer Mode (ATM) format, and Frame Relay format.

* * * * *